Figure 5:
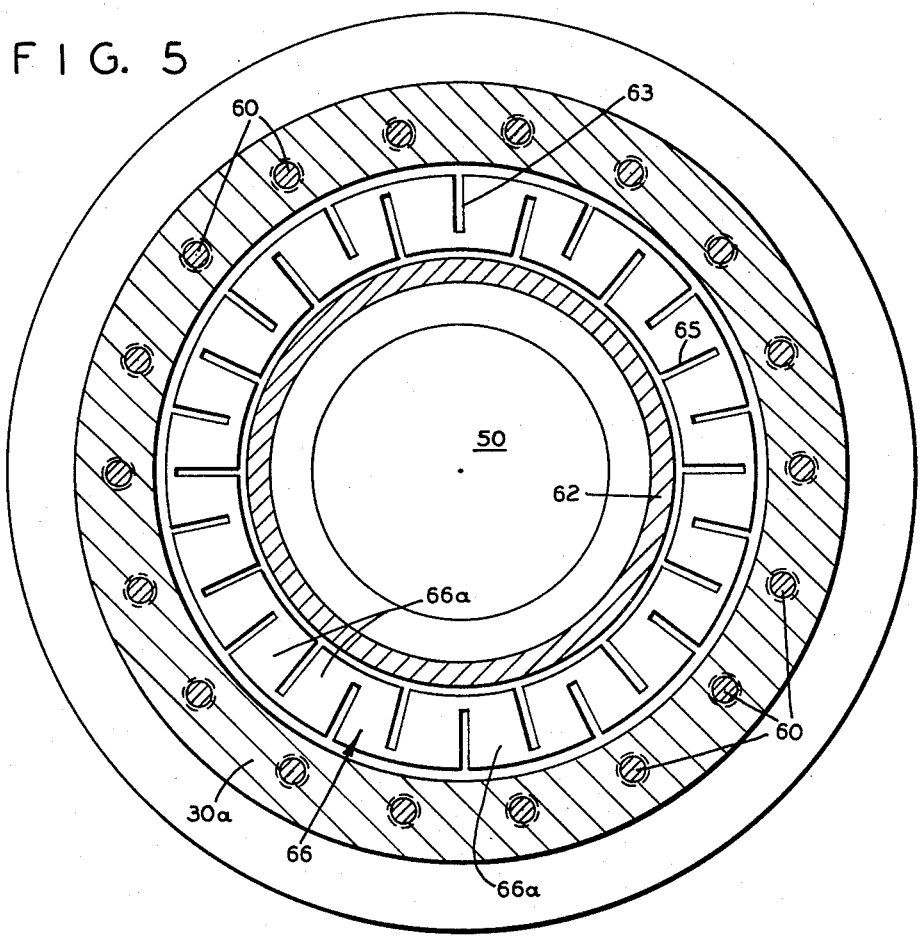

Nov. 15, 1960  M. C. TATE  2,960,328
WEIGHING APPARATUS AND SYSTEMS
Filed July 5, 1957  4 Sheets-Sheet 1
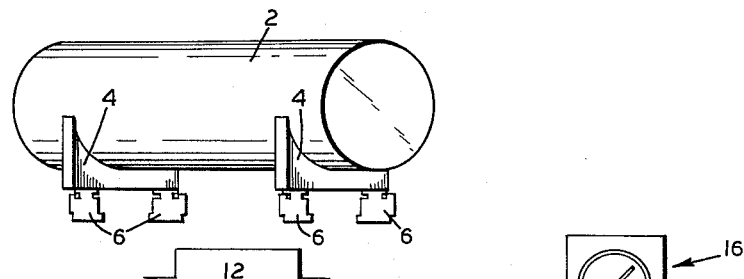
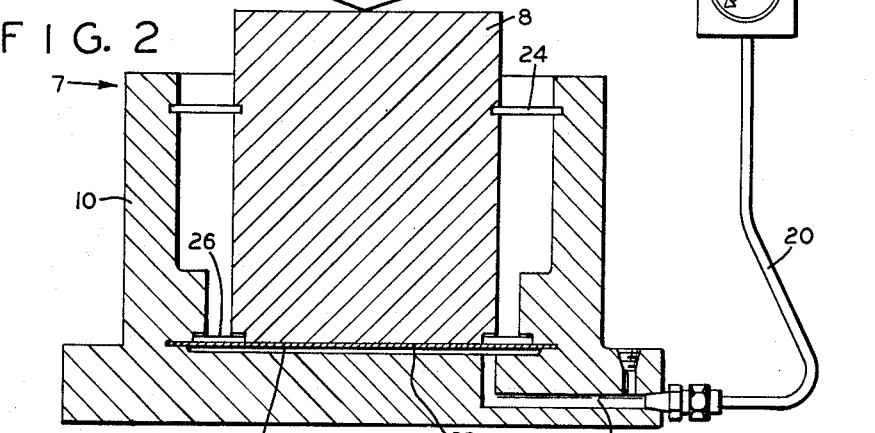
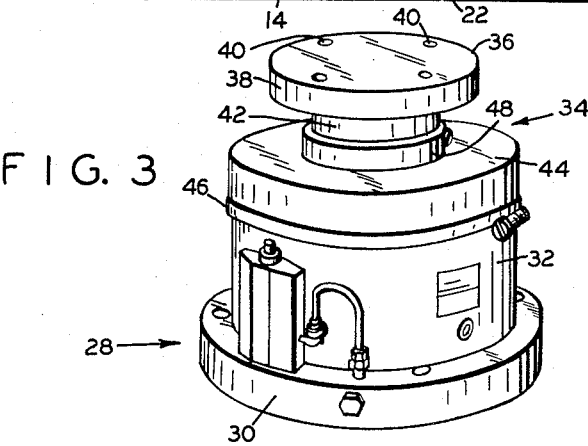
INVENTOR.
MALCOLM C. TATE
BY
*Blair & Spencer*
ATTORNEYS.

Nov. 15, 1960   M. C. TATE   2,960,328
WEIGHING APPARATUS AND SYSTEMS
Filed July 5, 1957   4 Sheets-Sheet 2
FIG. 4
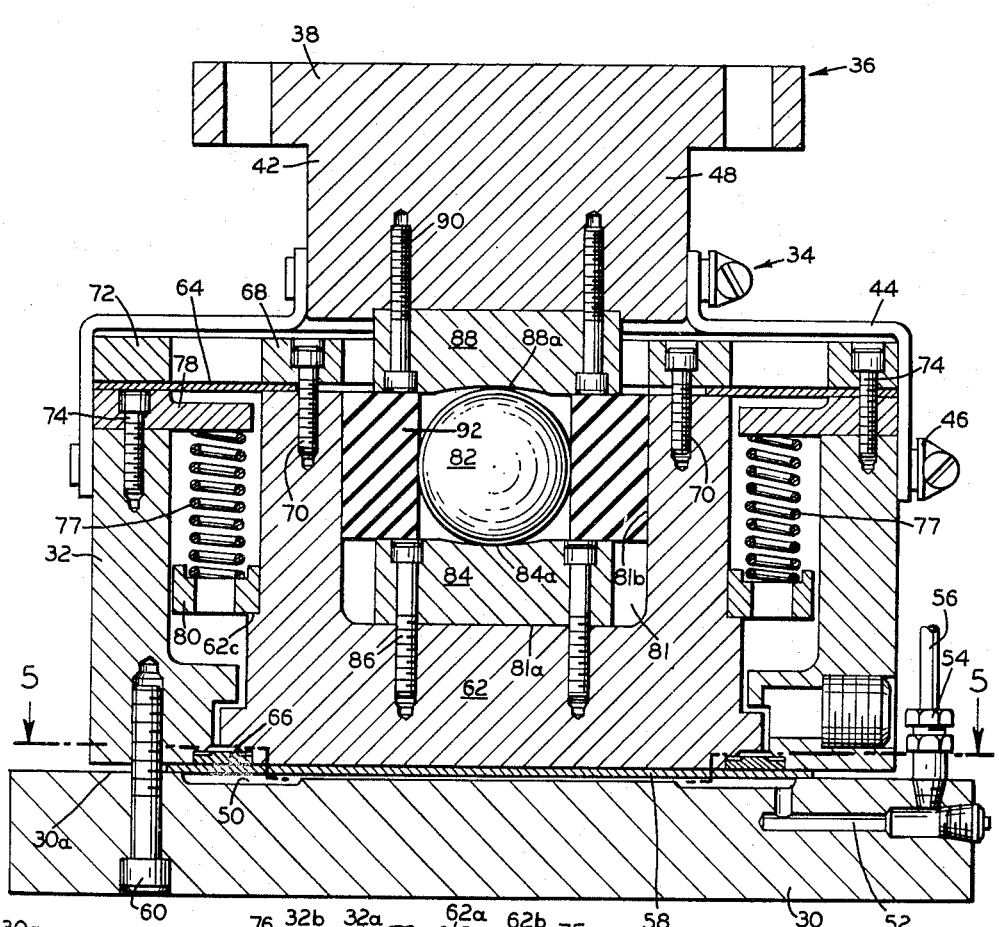
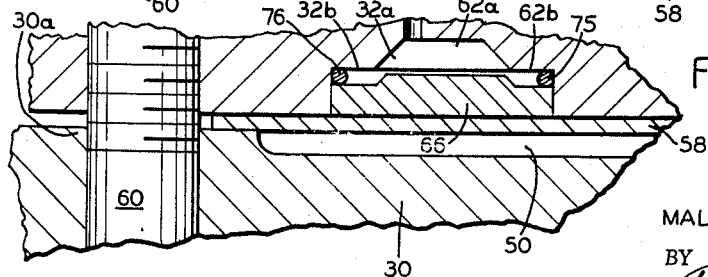
FIG. 8
INVENTOR.
MALCOLM C. TATE
BY Blair H. Spencer
ATTORNEYS.

INVENTOR.
MALCOLM C. TATE
BY Blair & Spencer
ATTORNEYS.

INVENTOR.
MALCOLM C. TATE
BY
ATTORNEYS.

United States Patent Office 2,960,328
Patented Nov. 15, 1960

2,960,328

WEIGHING APPARATUS AND SYSTEMS

Malcolm C. Tate, Stamford, Conn., assignor to A. H. Emery Company, New Canaan, Conn.

Filed July 5, 1957, Ser. No. 670,048

12 Claims. (Cl. 265—47)

This invention relates to systems for weighing large loads and particularly to the structure of a component used in such systems. More specifically, it relates to weighing apparatus using improved hydraulic weighing cells and pivot assemblies which minimize the effects of non-vertical and off-center forces.

For weighing large loads, conventional load weighing apparatus of the beam scale type is often inadequate. Therefore, weighing cells relatively small in size and adapted for remote indication have been developed. Thus, as seen in Figure 1, a tank 2 is cradled in supporting members 4. To ascertain its weight, perhaps to determine its content volume, weighing cells 6 may support the tank. Accordingly, the sum of the loads on the weighing cells will be equal to the total weight of the tank, and this may be registered at a suitable remote indicator (not shown).

A weighing cell of the hydraulic type is particularly effective for this purpose; the load to be measured is applied to a piston which, moving in a closed cylinder, exerts a pressure on a liquid enclosed therein. The pressure of the liquid is thus a measure of the magnitude of the load, and this may be registered on a conventional pressure-sensitive indicating device. In Figure 2 there is shown a simplified view of a conventional hydraulic weighing cell. Thus, a piston 8 is adapted to move downwardly in a closed cylinder 10 in response to a load indicated by the arrow 12, thereby acting upon a fluid in a pressure chamber 14. The chamber 14 communicates with a suitable pressure sensitive indicating device generally indicated at 16 through a passageway 18 and a line 20. Thus, the indicator 16 measures the pressure of the fluid in chamber 14 resulting from the force exerted on piston 8, and the scale of the indicator may be calibrated to read directly in terms of such force or in any other desired units.

To seal off the pressure chamber 14, a diaphragm 22 is provided extending across the cylinder 10 and serving to transmit the force exerted by piston 8. The piston is supported in the cylinder 10 by an annular stay plate 24 and a bridge ring 26, both interposed between the piston and cylinder walls and fitted therein to offset side thrusts on the piston without affecting materially its axial movement in response to the load being measured. Such piston supports are particularly effective in eliminating friction encountered where the piston moves in a tight-fitting cylinder, since the stay plate and bridge ring merely deflect upon movement of the piston 8 and all relative movement is eliminated. Such supporting members also minimize inaccuracies stemming from off-center loading, again because they are essentially frictionless.

My invention is primarily concerned with apparatus for coupling the measured load to the piston of a hydraulic weighing cell. It is designed to further decrease the effect of off-center loading on the cell and to eliminate the torque exerted on the piston by weighed objects which do not lie flush on the upper piston surface.

Another problem which I have overcome is that of transverse thrust resulting from expansion and contraction of the weighed objects under temperature change. For example, as can be understood from Figure 1, an increase or decrease in temperature will change the length of the tank 2, thereby exerting a considerable horizontal force on the weighing cells 6. These forces may be large enough to break or bend the stay plates 24, resulting in inaccurate measurement until the damage is discovered. Moreover, under certain weighing conditions, for example the weighing of railroad cars, a considerable side thrust may be encountered in the form of shock occasioned by the movement of the load over the cell. My novel weighing apparatus serves also to overcome these problems.

In certain cases, where the distribution of the load is known, the weighing system may be simplified by replacing some of the weighing cells with non-weighing supports. For example, in Figure 1 the two cells 6 on the left may be replaced by nonweighing supports, and if the relative distribution of the load on the supports and the weighing cells 6 is known, the total weight of the load may be ascertained from the weight indication of the remaining weighing cells at the right. For effective use of such a system no torque should be exerted on the load by the supports, weighing or non-weighing. Moreover, practical considerations require that the load be essentially restricted against horizontal movement. Prior non-weighing supports have not provided a practical solution of this problem.

Accordingly, it is an object of my invention to provide an improved hydraulic weighing cell which is substantially unaffected by limited shifting of the load imposed thereon. It is another object of my invention to provide a hydraulic weighing cell of the above character which is substantially impervious to shock. It is a further object of my invention to provide a weighing cell of the above character which exerts no torque on the load. A still further object of my invention is to provide an improved loading assembly adapted to transmit the load to the weighing cell without transmitting torque and unwanted force components. Another object of my invention is the provision of such a loading assembly which inhibits substantial translatory movement of the load. Yet another object of my invention is to provide an improved load weighing system utilizing a weighing cell in combination with a non-weighing load support. A further object of my invention is to provide a load weighing system of the above character providing automatic compensation for expansion and contraction of the load. A final stated object of my invention is to provide an improved non-weighing load support for use in systems of the above character. Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 7:
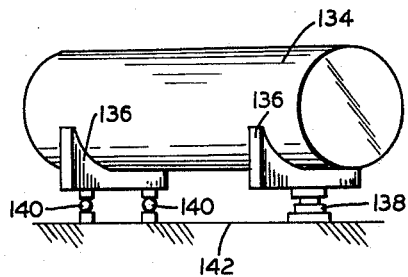
Figure 6:
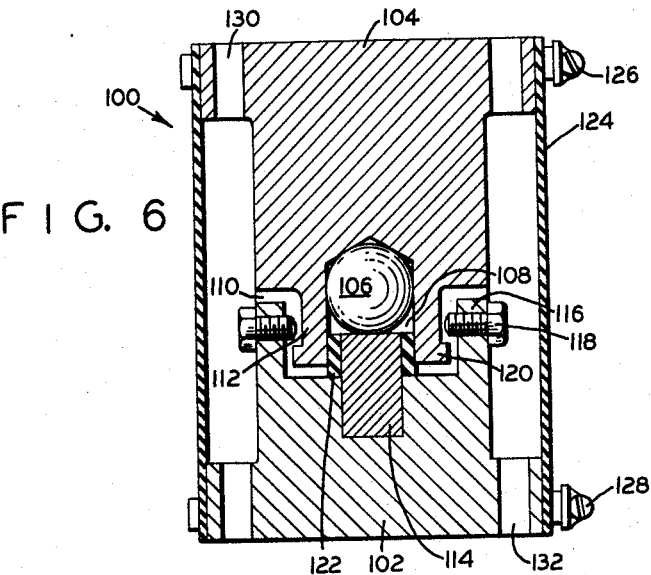
Figure 9A:
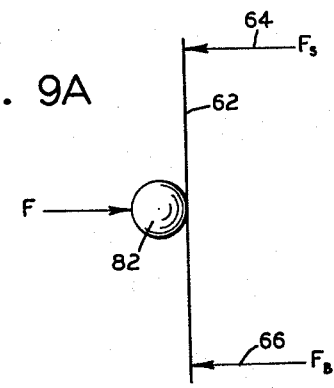
Figure 9B:
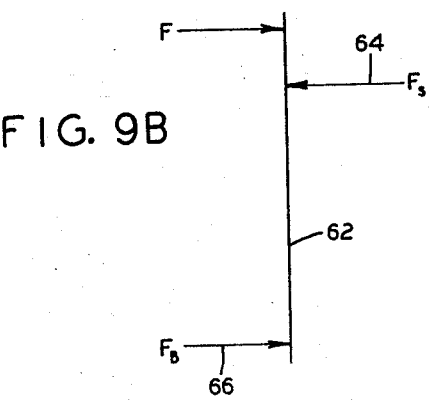

For a fuller understanding of the nature and objects of the invention, reference should be had to the following detailed description taken in connection with the accompanying drawings in which:

Figure 1 is a perspective view of a tank mounted on four weighing cells having the features of the present invention incorporated therein, Figure 2 is a schematic vertical sectional view of a hydraulic weighing cell shown connected to typical indicating equipment, Figure 3 is a perspective view of a hydraulic weighing cell having the features of my invention therein, Figure 4 is an enlarged vertical sectional view of the weighing cell shown in Figure 3, Figure 5 is a horizontal sectional view taken along line 5—5 of Figure 4, Figure 6 is a fragmentary vertical section of supporting structure to be used in connection with the weighing cell described in Figure 4, Figure 7 is a perspective view of a tank being weighed by a single hydraulic cell by use of two pivot assemblies, Figure 8 is an enlarged fragmentary vertical sectional view of a portion of the structure shown in Figure 4, Figure 9A is a schematic force diagram showing the relation of certain forces exerted on various parts of a weighing cell, and Figure 9B is another force diagram showing the relation of certain forces on various parts of a weighing cell incorporating the features of my invention.

Similar reference characters refer to similar parts throughout the several views of the drawings.

My improved weighing cell has an articulated loading assembly in which one member is adapted to roll over the other. More particularly, the hydraulic cell includes a ball interposed between the loading head and the piston. The loading head is attached to the object being weighed and thus transmits the load through the ball to the piston. Should the load move horizontally, for example due to expansion or contraction caused by a change in temperature, the loading head will move correspondingly causing the ball to roll on the piston, thereby eliminating any transverse force thereon. Also, since the ball moves only one half as far as the loading head, during any such rolling action the load being weighed is maintained close to the piston center line. Accordingly, a shift in the load inhibits off-center loading on the piston. As a further feature of this invention, the loading head is permitted to pivot on the ball, hereby preventing the transmission of torque between the piston and the load and also providing a self-balancing arrangement in cases where the surface of the object in contact with the loading head is not parallel to the face of the piston.

Turning now to Figure 3, the present invention is shown incorporated in a hydraulic weighing cell generally indicated at 28 having a base 30 supporting a cylinder 32. A loading assembly generally indicated at 34 includes a loading head generally indicated at 36 having a flat upper portion 38 with suitable threaded holes 40 to facilitate attachment to an object to be weighed. A cylindrical lower portion 42 of the loading head 36 extends into the cylinder to be connected to other elements of the cell in a manner to be described. A flexible boot 44, preferably of synthetic rubber or the like, is suitably fastened to the cylinder 32 and portion 42 as by clamps 46 and 48 to seal the interior of the cell from dirt, etc.

As best seen in Figures 4 and 5, a pressure chamber 50 takes the form of a generally circular indentation in the top surface of the base 30, and a passageway 52 in the base communicates with the exterior of the cell 28 for connection to a suitable pressure-sensitive indicating device through a coupling 54 and line 56. An annular shoulder portion 30a extending above the pressure chamber serves as one jaw of a clamp securing in place a diaphragm 58 preferably of stainless steel. As best seen in Figures 4 and 8, base 30 is bored to admit a series of bolts 60 threaded into the lower portion of the cylinder 32 to fasten the base to the cylinder and clamp the diaphragm therebetween.

Still referring to Figure 4, cylinder 32 contains a piston 62 resting on diaphragm 58 and supported against transverse movement by an annular stay plate 64 and a bridge ring 66. The stay plate is fastened to the upper portion of the piston by a clamp comprising an annular ring 68 fixed in position by bolts 70 threaded into the piston. It is similarly fastened to the cylinder by a clamping ring 72 and a series of bolts 74. Bridge ring 66, as best seen in Figure 8, fits in annular notches 32a and 62a in the cylinder 32 and piston 62, respectively, and is supported against the upward force due to pressure in chamber 50 by a pair of wires 75 and 76 bearing on shoulders 32b and 62b in the respective notches. These wires form in effect substantially frictionless pivots for the bridge ring upon deflection thereof during movement of piston 62.

It will be apparent that in addition to supporting piston 62 against transverse movement, bridge ring 66 reinforces diaphragm 58 to withstand the hydraulic forces in the pressure chamber. As best seen in Figure 5, a series of notches 63 extend inwardly from the outer edge of the bridge ring while a series of notches 65 are interposed therebetween and extend outwardly from the inner edge thereof. Thus the bridge ring is formed in a series of segments 66a to thereby markedly increase its ability to deflect and yet allowing for sufficient ring thickness to effectively support the diaphragm 58.

To enhance the linearity of hydraulic weighing apparatus, it is often desirable to apply a relatively small initial pressure to take up the slack in the system. As seen in Figure 4, I prefer to supply such pressure by using biasing springs 77 acting between piston 62 and cylinder 32 to exert an initial downward force on the piston. More particularly, springs 77 may be compressed between an annular stop 78 fastened to the cylinder by bolts 74 and a ring 80 seated against an annular shoulder 62c on the piston.

Accordingly, the load to be weighed is applied in the direction of the arrow (Figure 4) to the piston 62 through the loading assembly 34 to be described. The piston moves downwardly, deflecting stay plate 64, bridge ring 66, and diaphragm 58, thereby to be transmitted to the fluid in chamber 50. The resulting pressure signal is conveyed to suitable indicating apparatus through passage 52 and line 56.

Still referring to Figure 4, the loading assembly 34 includes a recess 81 in piston 62 containing a ball 82 which is interposed between the load and piston in a manner to be described. More particularly, recess 81 may carry on its bottom surface 81a a wear plate 84 of hardened steel fastened in place by bolts 86. A similar wear plate 88 is fastened to portion 42 of the loading head by bolts 90. Preferably a ring 92 of resilient material such as neoprene or the like is interposed between the ball 82 and the sidewalls 81b of recess 81. This ring serves to center the ball during assembly of the call and is also a shock absorber in a manner to be described. Preferably the opposing surfaces 84a and 88a of wear plates 84 and 88, respectively, which contact ball 82, are concave to provide an equilibrium position along the center line of piston 62. Thus the transmission of force to piston 62 is through loading head 36, wear plate 88, ball 82, and wear plate 84.

It will now be apparent that the loading head 36 may pivot about ball 82 so that portion 38 is at an angle to the horizontal. Therefore, if the object being weighed which is attached to portion 38 inclines at a slight angle to the horizontal, loading head 36 will pivot correspondingly and still transmit the load through the ball 82 to piston 62 along its center line. Thus the off-center loading encountered under some operating conditions is essentially eliminated. Further, the pivotal connection described does not permit transmission of torque to the weighing cell.

Should the object being weighed expand or contract, loading head 36 must move accordingly, rolling on ball 82. Such freedom to move in the horizontal plane, perpendicularly to the direction of piston travel, substantially eliminates the transverse forces formerly imposed on the stay plate and bridge ring with the resulting deleterious effects described above. Moreover, for a given horizontal displacement of the loading head the ball rolls only half as far, resulting in a very slight displacement from the center line of the piston.

In applications where weighing cells are subject to reaction forces exerted by transversely accelerated objects, the combination of the resilient ring 92 and the translatory freedom of the loading head 36 serves to diminish the shock load on the piston supports. Thus, when these forces are imposed on the loading head it translates by rolling on the ball 82. As the ball moves against the resilient ring 92, it encounters an increasing reaction force and comes to a gradual stop before returning to the center line position with the aid of the concave surfaces 84a and 88a.

The loading assembly 34 with ball 82 as described further enhances the operation of the weighing cell 28 by minimizing the force on stay plate 64 in response to a transverse load. As best seen in Figure 9A, in which the various elements are shown schematically for purposes of greater clarity, an external transverse force F is transmitted through the center of ball 82 to piston 62. Stay plate 64 and bridge ring 66 exert reaction forces Fs and Fb, respectively, whose sum equals F. Thus both Fs and Fb are less than F, and if the center of the ball lies midway between the stay plate and bridge ring, Fs and Fb will each be equal to $F/2$.

Referring to Figure 9B, illustrating operation without the loading assembly of the present invention, it is seen that external force F is applied to piston 62 above stay plate 64. Thus this force exerts a clockwise (Figure 9B) torque about the stay plate which is balanced by a counterclockwise torque resulting from force Fb of bridge ring 66. Since force Fb is in the same direction as F, Fs equals the sum of F and Fb and is thus greater than F. Consequently, transverse loads imposed on the piston of such weighing devices often caused failure of the stay plate, a condition largely eliminated by the reduction of reaction forces occasioned by use of the ball 82 lying between stay plate 64 and bridge ring 66 of the loading assembly 34.

In Figure 6 I have illustrated an improved pivot assembly generally indicated at 100 having a pedestal 102 and a loading head 104 with a force-transmitting ball 106 disposed therebetween. More specifically, head 104 is bored to form a ball-containing recess 108 and is recessed as indicated at 110 to form the integral annulus 112 between the recess and notch. Pedestal 102 is preferably bored to admit a hardened steel insert 114 extending upwardly into recess 108. The pedestal is formed with an outer ring portion 116 fitting into recess 110 about annulus 112. A pair of set screws 118 threaded through portion 116 cooperate with an annular flange 120, preferably formed integrally with portion 112, to lock loading head 104 and pedestal 102 together. A resilient ring 122, preferably of synthetic rubber or the like, may be inserted between the insert 114 and portion 112 to center the entire unit, while a flexible boot 124 of any suitable material may be fastened to the loading head and pedestal by clamps 126 and 128 to seal the interior from dirt, etc.

Still referring to Figure 6, pivot assembly 100 may be suitably fastened to the object being weighed and to a stationary object by means of bolt holes 130 in the loading head 104 and holes 132 in pedestal 102. If the surface to which the loading head 104 is secured moves angularly away from the horizontal, the assembly will articulate correspondingly; thus, loading head 104 pivots on ball 106 about pedestal 102 to attain the desired angular relationship. Again, no torque is exerted by the pivot assembly 100 on the object being weighed. Moreover, the assembly reduces shifting of the load to negligible proportions because of the interengagement of retainer 120 and ring portion 116.

In Figure 7 there is illustrated a tank weighed by a weighing cell having the features of the present invention in combination with a pair of pivot assemblies similar to assembly 100. Thus a tank 134 resting on cradle supports 136 is supported at one end by a weighing cell 138 and at the other by a pair of pivot assemblies 140, all schematically illustrated in this figure. With the weighing cell and pivot assemblies constructed as described above, no torque will be exerted on the tank by any of the supporting members, and thus should the tank not be level, i.e. not parallel with the supporting surface 142, the intended accuracy will be maintained. Moreover, whenever the tank expands or contracts in response to temperature changes, the loading head of the weighing cell 138 will move to a new position in the manner described, again assuring the desired accuracy of operation. Further, cell 138 and pivot assemblies 140 firmly secure the tank in place while permitting some movement without sacrificing weighing accuracy.

Thus I have described an improved weighing cell which maintains desired accuracy in spite of non-level loading and which compensates internally for changes in load position due to temperature change, etc. These features are accomplished by a novel loading assembly in which a loading head rolls along a ball supported on the load-receiving element, e.g. piston, of the weighing cell. Additionally, my loading assembly protects the cell from shock and in the case of a hydraulic unit may serve to minimize and equalize transverse forces exerted on the stay plate and bridge ring.

I have also described a novel non-weighing load support which, while serving to secure the weighed object in position, exerts no torque on it.

It will be understood that the present invention and the apparatus in which it is incorporated may serve to measure other forces than those resulting from weights of objects, and therefore the term "weighing" as used herein and in the claims includes the measurement of other forces susceptible of determination by such apparatus.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, and all statements of the scope of the invention which, as a matter of language, might be said to fall therebetween.

I claim:

1. In weighing apparatus, in combination, a cylinder having a pressure chamber in its base, a diaphragm extending across said chamber, a piston reciprocally mounted in said cylinder, an annular stay plate bridging the space between and connected to said cylinder and said piston, a recess in said piston, a loading head located above said piston, a rolling ball disposed in said recess and supporting said head on said piston, the center of said ball being disposed below said stay plate, and means resiliently supporting said ball in said position.

2. The combination defined in claim 1 in which there is an annular ring resting on said diaphragm and disposed between said cylinder and said piston.

3. The combination defined in claim 2 in which there are a pair of annular wires, one disposed between said ring and said cylinder and the other disposed between said ring and said piston.

4. The combination defined in claim 1 having compression springs disposed between said cylinder and said piston to urge said piston against said diaphragm.

5. In weighing apparatus, in combination, a cylinder having a pressure chamber in its base, a diaphragm fitting over said chamber, a piston mounted for reciprocation in said cylinder and resting upon said diaphragm, an annular stay plate bridging the space between and connected to said cylinder and piston, an annular bridging ring disposed below said stay plate and bridging the space between said cylinder and piston, means forming a recess in said piston extending below said stay plate, a load-supporting head, means forming concavities in the opposed surfaces of said recess and said head, and a rolling member resting in said concavities to permit relative movement between said load head and said piston transverse to the axis thereof.

6. The combination defined in claim 5 in which the rolling member is a ball.

7. The combination defined in claim 5 in which the center of said rolling member is disposed below said stay plate.

8. The combination defined in claim 7 including a resilient ring disposed in said recess and surrounding said rolling member, said ring being of such thickness as to intercept said rolling member on lateral rotation thereof and thereby attenuate lateral shock transmitted between said load-supporting head and said piston.

9. A loading assembly for transmitting a load to be weighed to a weighing unit having a load-receiving element axially yieldable in response to said load, said unit including a pair of axially-spaced supports restraining said element from lateral movement, said assembly comprising, in combination, a recess in said element having a bottom surface facing said load, a ball resting on said bottom surface, the center of said ball being disposed between said supports and a loading head resting on said ball, said bottom surface of said recess and the surface of said head engaging said ball being so shaped as to permit said ball to move relative to both of said surfaces, said ball transmitting said load through said loading head to said load-receiving element.

10. The combination defined in claim 9 in which the opposing surfaces of said recess and loading head in contact with said ball are concave.

11. The combination defined in claim 10 including an element of resilient material between said ball and the walls of said recess.

12. In weighing apparatus, in combination, a cylinder having a pressure chamber in its base, a diaphragm extending over said chamber, a piston mounted in said cylinder and resting upon said diaphragm, an annular ring resting on said diaphragm, said ring extending between the bottom portions of said piston and cylinder and being in free engagement therewith to prevent lateral movement of said piston while permitting reciprocation thereof, a recess extending downwardly into said piston, a load-supporting head disposed above said recess, and rolling means between said head and the bottom of said recess, the bottoms of said head and recess being so surfaced as to permit said rolling means to roll between them and thereby allow lateral movement of said head over said piston, said bottom portions of said piston and cylinder being closely spaced and the bottom of said piston and the corresponding portion of said cylinder being notched to accommodate said ring, the inner and outer edges of said ring abutting said notched portions, and wires resting on the top surface of said ring adjacent said edges and bridging the space between said top surface and said piston and cylinder, said wires serving as pivots facilitating deflection of said ring during reciprocation of said piston.

References Cited in the file of this patent
UNITED STATES PATENTS

| Re. 13,816 | Deister | Oct. 27, 1914 |
| 566,698 | Raab | Aug. 25, 1896 |
| 1,579,658 | Pugh | Apr. 6, 1926 |
| 1,818,001 | Moorehouse | Aug. 11, 1931 |
| 2,314,011 | Maurer | Mar. 16, 1947 |
| 2,430,702 | Bohannan | Nov. 11, 1947 |
| 2,561,321 | Tate | July 17, 1951 |
| 2,616,946 | Scheer | Nov. 4, 1952 |
| 2,652,241 | Williams | Sept. 15, 1953 |
| 2,932,501 | Hicks | Apr. 12, 1960 |